United States Patent [19]
Hendrickson et al.

[11] 3,745,957
[45] July 17, 1973

[54] SLIDING HATCH COVER FOR SAILBOATS

[76] Inventors: Arthur M. Hendrickson, 4607 Orrington Drive, Corona Del Mar; William I. B. Crealock, 657 West 19th St., Costa, both of Calif.

[22] Filed: May 6, 1971

[21] Appl. No.: 140,911

[52] U.S. Cl. .................. 114/202, 160/180, 49/170
[51] Int. Cl. ............................................. B63b 19/18
[58] Field of Search ................. 114/202, 201, 117, 114/120, 39; 160/180; 49/69, 169, 170; 220/38

[56] References Cited
UNITED STATES PATENTS

| | | | |
|---|---|---|---|
| 2,836,140 | 5/1958 | Hunt | 114/201 X |
| 3,619,632 | 11/1971 | Labombarde | 114/39 |
| 3,312,990 | 4/1967 | Lapworth | 9/1 |
| 987,197 | 3/1911 | Walker | 49/169 |

*Primary Examiner*—Milton Buchler
*Assistant Examiner*—E. R. Kazenske
*Attorney*—Auzville Jackson, Jr.

[57] ABSTRACT

The disclosure is directed to a sliding hatch cover for a sailboat having a slot covered by small subhatch to permit the hatch cover to slide partially past the mast.

7 Claims, 7 Drawing Figures

PATENTED JUL 17 1973 3,745,957

INVENTORS.
ARTHUR M. HENDRICKSON
WILLIAM I.B. CREALOCK
BY
Auzville Jackson Jr.
ATTORNEY

PATENTED JUL 17 1973 3,745,957

INVENTORS.
ARTHUR M. HENDRICKSON
WILLIAM I.B. CREALOCK
BY
Auzville Jackson Jr.
ATTORNEY

SLIDING HATCH COVER FOR SAILBOATS

BACKGROUND OF THE INVENTION

The present invention relates to a sliding hatch cover for a sailboat which has a slot therein to permit the hatch cover to slide part way beyond the mast location. The slot has a covering means to close it off from the elements when the hatch cover itself is closed which is preferably in the form of a small sub-hatch hinged to the hatch cover.

At the present time recreational sailboats with an overall length between approximately 16 feet and 27 feet having cabins or sold in large quantities. Boats of this size range frequently have insufficient space on the cabin top between the cockpit and the mast location to permit a sliding hatch to slide sufficiently forward from the cockpit to expose a hatch opening as large as is sometimes desired. Frequently the hatch opening is the only area of the cabin which has full head room on the smaller boats and so the larger this area becomes the greater the habitability of the cabin of the boat when the hatch is open.

SUMMARY OF THE INVENTION

In accordance with the present invention, a sliding hatch cover extending between the cockpit and mast location has a slot therein which extends part way into the length of the hatch cover opening in the direction of the mast location to permit the hatch cover to slide partially past the mast to provide a larger hatch opening and access to the cabin of the sailboat. When the hatch cover is closed a covering means for the slot is provided which provides sufficient cover to prevent entry of the elements into the cabin. This is preferably in the form of a hinged sub-hatch with a peripheral flange that is received into a mating recessed groove on the hatch cover when the subhatch is in the closed position.

The hatch cover has a transverse extending handle and stiffener adjacent to rearward or cockpit end of the sailboat with a downwardly extending flange which functions as a lip in the closed position to roof over the top edge of the hatch door or hatch boards vertically placed between the cockpit and cabin when it is closed up. This rearward downwardly extending flange also serves as a stop member to prevent the hatch cover from being opened beyond the desired point. The front of the hatch cover or leading edge adjacent the mast location also has a forward downwardly extending flange which helps to prevent the entrance of the elements and which also serves to arrest and stop the hatch cover from closing beyond the desired point.

The hatch opening is surrounded on the front end adjacent the mast location and the two sides by upwardly extending coaming which acts as a stiffening flange as well as a baffle and stop to prevent the elements such as rain and the like fron entering into the hatch opening and cabin area of the boat when the hatch cover is closed. The upwardly extending coaming on the front of the hatch opening also provides a stop means which cooperates with the rearward and forward downwardly extending flange to arrest and stop the forward and rearward movement of the hatch cover respectively to the desired point.

The hatch cover has two outwardly extending flanges on each side which ride in grooves of two longitudinally extending hatch slides in a manner such that the hatch cover does not rub across the cabin top or upwardly extending coaming surrounding the hatch opening but has a small clearance to permit easy and nonabrasive opening and closing of the hatch.

In order to accomodate the vertically extending coaming on the sides of the hatch opening two notches are cut on the rearward downwardly extending flange of the hatch handle and stiffening member.

The hatch cover thus provided excellent protection of the cabin interior from the elements such as rain, seaspray, snow and the like when in a closed position but when in the open position provides a large opening permitting light to enter the cabin and unlimited head room in the cabin in the area of the opening plus easy entrance into and from the cabin.

On the smaller boats the top of the cabin may only be chest high from the sole of the cabin and thus the hatch opening is an excellent position on this size of boat for one of the crew members to stand during sailing.

While the hatch cover has been indicated as primarily being useful in smaller sailboats having a forward cabin, it is obviously usable also on larger sailboats and in situations such as rear cabins and the like when a larger than normal opening is desired but prevented from being achieved by the usual hatch arrangement because of a mast location.

Many other advantages of the present invention will become apparent from the following description taken in connection with the accompanying drawings.

DESCRIPTION OF THE INVENTION

Figure 1:
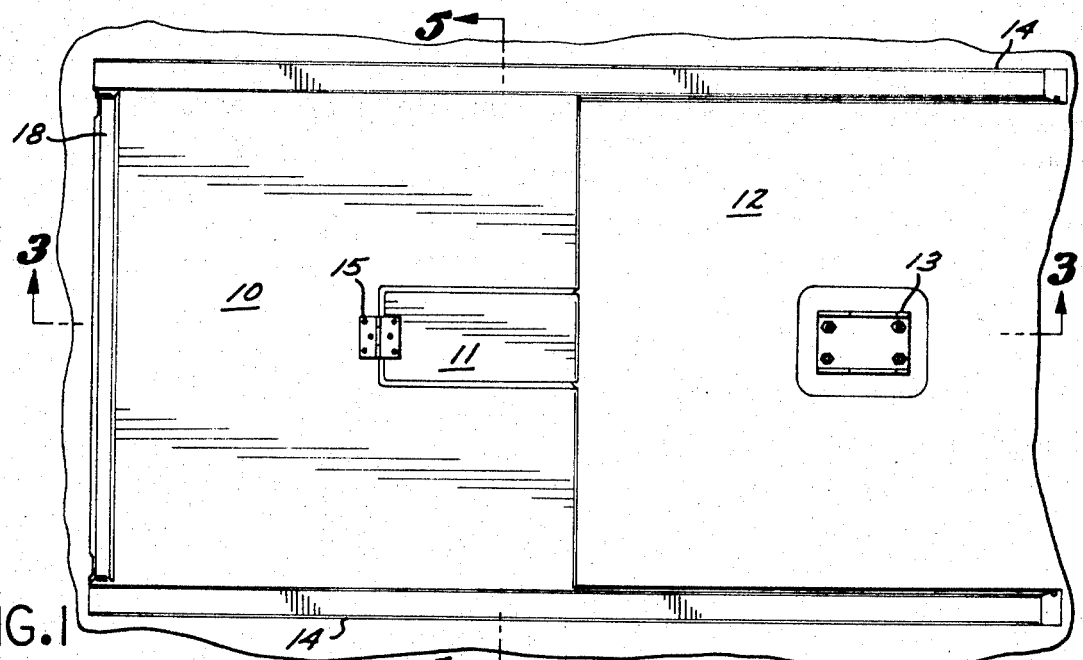
FIG. 1 is a plan view of the sliding hatch cover arrangement of this invention shown located on a broken away section of a boat cabin top.
Figure 2:
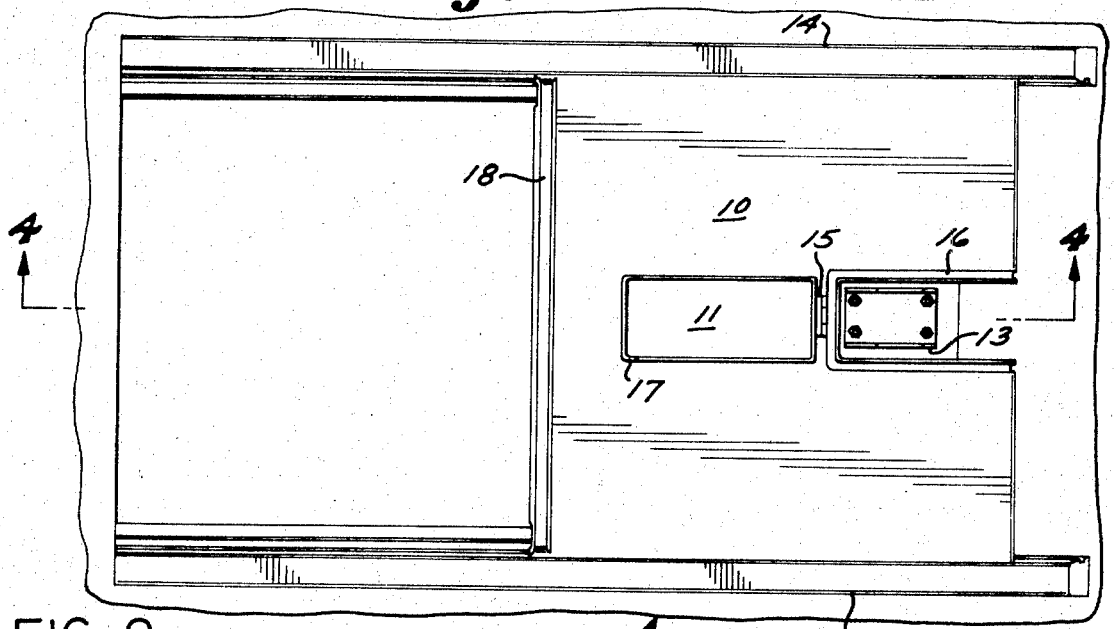
FIG. 2 is a view similar to FIG. 1 with the hatch cover in the open position and the sub-hatch folded to an open position.

With reference to FIGS. 1 and 2 there is shown a sliding hatch cover 10 having recess therein a sub-hatch 11. The hatch cover and sub-hatch are provided on the cabin top 12 of a sailboat. The remainder of the sailboat is now shown in the drawings but would be of a usual type to which this invention may be applied.

Also located on the cabin top is a mast location which as shown in the drawings is in the form of a mast step 13 but could just as well be a tabernacle or a mast partner when goes through the cabin top down into the cabin or some other similar arrangement for the mast. In some sailboats and especially the smaller ones the mast location prevents the hatch cover from sliding a sufficient distance to provide an opening as large as is sometimes desired.

By providing the sliding hatch with a notch or slot covered by the sub-hatch as shown in the drawings, the hatch cover is able to slide partially beyond the mast location as shown in FIG. 2.

Figure 3:
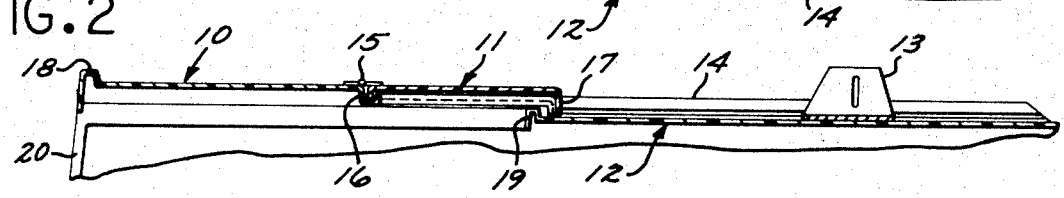
FIG. 3 is a longitudinal sectional view taken on section 3—3 of FIG. 1.

The hatch cover is held onto the cabin top and guided by grooves in two hatch slides 14. The sub-hatch is held in a pivoting manner to the hatch by hinge 15 and when open exposes a recessed groove 16 on the hatch into which the sub-hatch flange mates or rests when in the closed position. The recessed groove extends fully around the cutout or slot in the hatch which is normally covered by the sub-hatch and extends over and down the edge of the hatch next to the mast location which is sometimes referred to herein as the forward downwardly extending flange. The flange on the sub-hatch extends completely around the sub-hatch and generally has a uniform depth except for the outboard or front portion which has a greater depth in order to carry the sub-hatch around the leading or forward edge of the hatch cover. This is best shown in FIG. 3 to which reference is made.

Thus, when the sub-hatch is in a closed position the flange thereof is received in the recessed groove of the hatch cover and serves to prevent sideways movement but more importantly provides a baffle for any water and the like to be arrested and drained therefrom. Any water falling onto the closed sub-hatch would move to the sides and downward into the recessed groove and from there it would move forward to drain around the leading edge of the hatch cover and onto the cabin top to run downward across the boat into the water.

The trailing or rearward edge of the hatch cover adjacent the cockpit has a stiffener and handle 18. This provides a grip to slide the hatch cover to its open and closed position and at the same time serves to provide substantial transverse stiffeners to reinforce the hatch cover at one of its weakest points. As best seen in FIG. 3, the handle has a rearward downwardly extending flange adjacent the cockpit which serves to provide a stop for the hatch cover when it is moved to its fully open position. This stop is created by the flange coming into contact with the stiffening flange or upwardly extending coaming around the hatch opening 19 the forward edge of the hatch opening adjacent the mast location. This is better seen in FIG. 4 where the hatch opening is nearly fully exposed.

It is readily seen that the stiffening flange upwardly extending or coaming at the forward end of the hatch opening and the rearward downwardly extending flange of the hatch handle will interfere with one another and prevent forward motion to the hatch beyond that point of contact. Likewise, the same stiffening flange or upwardly extending coaming serves to stop the movement of the hatch to the rear when it is being closed by interfering with the rearward movement of the forward downwardly extending front edge of the hatch cover and sub-hatch as best seen in FIG. 3 where the hatch is almost to its fully rear position. As can best be seen in FIG. 3, the hatch cover is almost to its rearward position before being stopped and will stop in a position just so that the rearward downwardly extending flange of the hatch handle will extend past the hatch opening 20 which would lead into the cockpit. This roofs over the top portion of a door or hatch boards (not shown) inserted vertically to close the vertical opening leading from the cockpit to the cabin.

Figure 4:
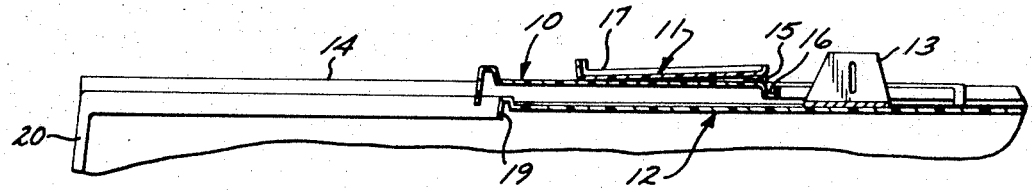
FIG. 4 is a longitudinal sectional view taken on section 4—4 of FIG. 2.
Figure 5:
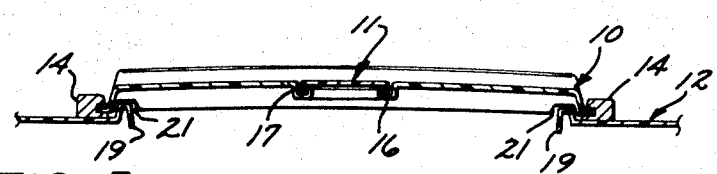
FIG. 5 is a transverse sectional view taken on section 5—5 of FIG. 1.

As can be seen best in FIGS. 4 and 5 the hatch opening stiffener or upwardly extending coaming 19 not only extends across the forward portion of the hatch opening but also extends along both sides of the opening. With reference to FIG. 5, the manner in which outwardly extending side flanges of the hatch cover are provided to ride in grooves in the two hatch slides is shown. It can be seen that the two hatch slides are affixed to the cabin top just outwardly from the side stiffening members or coaming of the hatch opening in that the groove lies below the top of said coaming. Thus there is provided a water baffle to prevent water from entering the hatch opening when the hatch is closed as such water will be baffled and stopped by the hatch opening coaming. This arrangement also causes the water to drain away from the hatch opening and downward into the water.

In order to accommodate the coaming at the side of the hatch opening there are provided two notches 21 in the rearward downwardly extending flange of the hatch handle.

The hatch cover and sub-hatch are permanently affixed to the boat so they cannot be readily removed or lost at sea by first assembling the outwardly extending side flanges of the hatch cover into the grooves in the two hatch slides and then fastening the hatch slide by adhesive or screws to the cabin top. In this manner the hatch cover can only slide in a forward and rearward manner and, as explained earlier, the sliding to and fro is arrested and stopped by the interference of the coaming across the forward end of the hatch opening.

Figure 6:
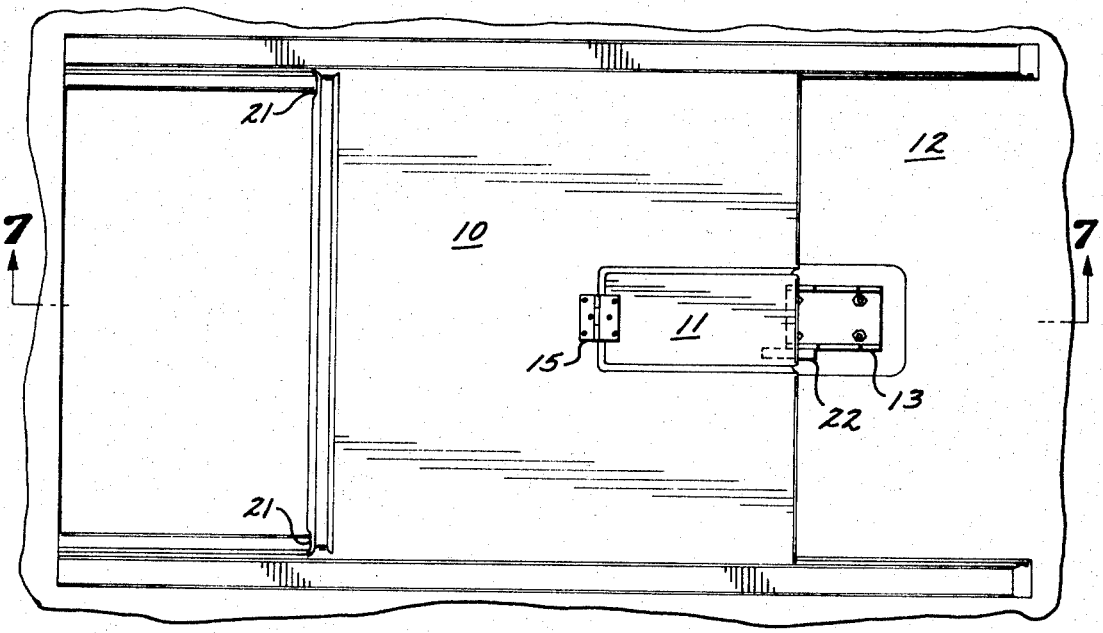
FIG. 6 is a plan view of a partially open hatch cover with the sub-hatch being cammed to a partially open position.
Figure 7:
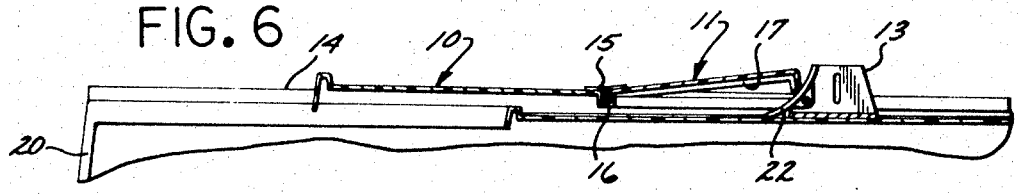
FIG. 7 is a longitudinal sectional view taken on section 7—7 of FIG. 6 and shows a side view of the cam associated with the mast step.

In the arrangement of FIGS. 1-5 the sub-hatch is opened by hand when the hatch cover is moved from a fully closed position to the open position. In FIGS. 6 and 7 is shown an arrangement that permits an automatic opening of the sub-hatch when the hatch cover is slid to a forward position. This is accomplished by providing a cam member 22 which the sub-hatch leading edge will contact and be wedged upward into an open position. The beginning of this camming or wedging action is best seen can be best seen in FIG. 6 where it can be readily appreciated that further forward movement of the hatch will cause the sub-hatch to more fully open and permit the hatch cover to be slid to a fully open position without the necessity of manually opening the sub-hatch.

While the invention has been specifically described above, it will be appreciated that it may be embodied in numerous other forms without departing from the spirit or essential characteristics of the invention herein. For example, although the normal situation is where the hatch cover would extend in the area between the cockpit and a forward mast of the boat so that the forward and leading edge of the hatch cover would be adjacent the mast and the hatch cover would be opened by sliding forward, the hatch cover could also be on a boat such as one with a rear cabin so that the hatch cover would be slid to an open position by sliding backwards. Thus the term forward, rearward leading edge, trailing edge and so forth are merely points of reference on the normal boat and are not to be considered as limitations. Therefore the present embodiments of the invention are to be considered in all respects as illustrative and not restrictive, the scope of the invention being indicated by the appended claims rather than by the foregoing description and all changes which come within the meaning and range of the equivalency of the claims are therefore intended to be embraced therein.

What is claimed is:

1. A hatch cover arrangement for a sailboat having a mast location, a cockpit, a cabin, and a cabin top extending from said cockpit to said mast location comprising the following:

a hatch opening in said cabit top adjacent said cockpit, a movable hatch cover for said opening having a longitudinally extending slot located on said hatch cover with a width to accommodate the width of a mast and a length extending from the side of the hatch cover adjacent said mast location part way across the length of said hatch cover, and a cover for said slot which is removable to expose said slot and permit said hatch cover to move part way past said mast location when said hatch cover is in a fully open position, said slot cover when closed completely covering said slot.

2. The hatch cover arrangement of claim 1 wherein said movable hatch cover moves by a sliding action and said slot cover is in the form of a rigid sub-hatch pivotly mounted on said hatch cover.

3. The hatch cover arrangement of claim 2 wherein said sliding hatch cover has a forward downwardly extending flange portion on the side adjacent said mast location with a recessed groove completely surrounding said slot including the portion adjacent said downwardly extending flange portion and a flange completely surrounding said sub-hatch adapted to be received in a mating manner into said recessed groove when said sub-hatch is in the closed position.

4. The hatch cover arrangement of claim 3 wherein a cam arrangement is provided near said mast location and in the path of said sub-hatch so as to automatically cam said sub-hatch into an open position when said hatch cover is slid to an open position.

5. The hatch cover arrangement of claim 4 wherein said sliding hatch cover has a combination handle and stiffening member adjacent said cockpit with a rearward downwardly extending flange.

6. The hatch cover arrangement of claim 5 wherein said hatch opening has an upwardly extending coaming on the two sides and the side adjacent said mast location with said coaming on the side adjacent said mast location cooperating with said forward downwardly extending flange on said hatch cover adjacent the mast location to arrest and stop the movement of said hatch cover to the closed position and cooperating with the rearward downwardly extending flange of said handle and reinforcing member to arrest and stop the hatch cover during its movement to an open position.

7. The hatch cover arrangement of claim 6 wherein two longitudinally extending hatch slides having grooves therein are affixed to said cabin top adjacent the sides of said hatch opening and an outwardly extending flange on each side of said hatch cover riding in said hatch slide grooves in a manner to permit said hatch cover to be slid to the open and closed position with sufficient clearance so as to not rub on said coaming surrounding said hatch opening and with notches in said rearward downwardly extending flange of said handle and reinforcing member to accommodate the said coaming on each side of said hatch opening.

* * * * *